Dec. 29, 1925.
C. W. HARRIS
UNIVERSAL JOINT
Filed Dec. 19, 1923
1,567,641
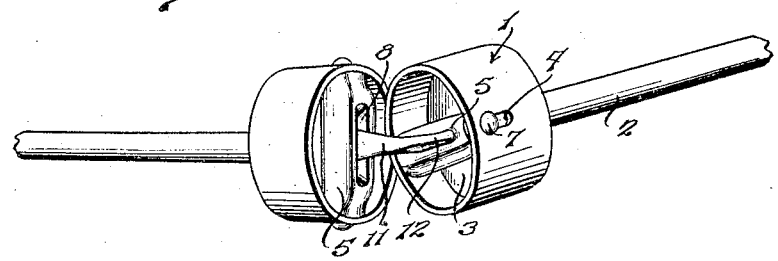
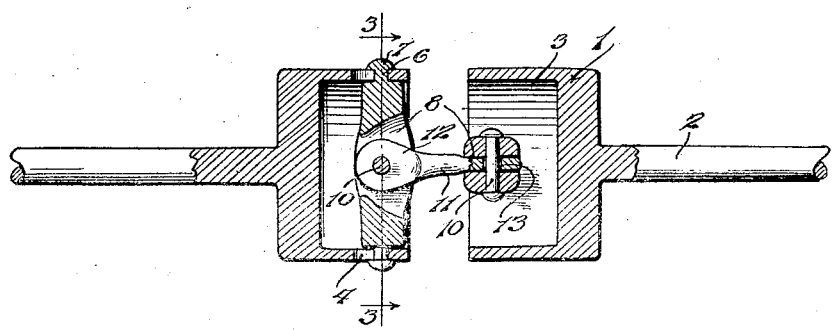
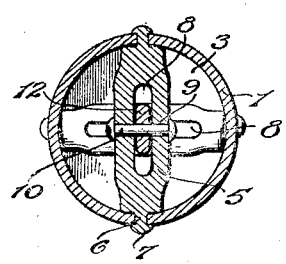

Patented Dec. 29, 1925.

1,567,641

UNITED STATES PATENT OFFICE.

CHARLES WALTER HARRIS, OF SALEM, CONNECTICUT.

UNIVERSAL JOINT.

Application filed December 19, 1923. Serial No. 681,587.

*To all whom it may concern:*

Be it known that I, CHARLES WALTER HARRIS, a citizen of the United States, residing at Salem, in the county of New London and State of Connecticut, have invented certain new and useful Improvements in Universal Joints, of which the following is a specification.

This invention relates to an improvement in universal joints and has as its object to provide a joint which will be free from binding and which will provide for the transmission of power from one shaft to another in all relative positions of the shafts without any interruption to or interference with such transmission, the joint being therefore particularly adapted for tractor use although it is not restricted to such use.

In the accompanying drawing:

Figure 1 is a perspective view of a universal joint embodying the invention;

Figure 2 is a longitudinal sectional view through the joint;

Figure 3 is a vertical sectional view taken substantially on the line 3—3 of Figure 2 looking in the direction indicated by the arrows.

The universal joint embodying the invention comprises a pair of heads indicated in general by the numeral 1 and each formed integral with or secured upon one end of a respective one of the two shafts 2 which are to be connected by the joint and from one to the other of which shafts power is to be transmitted regardless of the angular disposition of the shafts with relation to each other. The heads 1 are of counterpart form and each is preferably substantially cylindrical and provided in its face which opposes the other head, with a recess indicated by the numeral 3, the said head, in the walls of this recess, being formed with slots 4 which extend parallel to the axes of the respective shafts. The numeral 5 indicates a knuckle which is disposed within the recess 3 of each respective head, and the said knuckles are provided at their ends with studs 6 which are slidably engaged in the slots 4, the knuckles extending diametrically across the interior of the respective heads, and the said studs 6 being headed, as indicated by the numeral 7, so as to provide against separation of the parts. The engagement of the studs 6 in the slots 4 provides for rotative movement of the respective knuckles 5 about the studs as pivots, and likewise a slight longitudinal play of the knuckles is permitted. The knuckles 5 are formed each with a longitudinally extending slot 8, and the walls of the slot in each knuckle, midway between the ends of the slot, are formed with oppositely located openings indicated by the numeral 9. Pivot pins 10 are secured through the openings 9 in the knuckles and extend across the slots 8, and a link 11 is provided at its ends with ears 12 which are received within the slots 8, the ears being apertured, as at 13, to accommodate the said pivot pins 10. By reference to the drawings it will be observed that the eyes 12 of the connecting link 11 are disposed at planes at right angles to each other so that as a consequence the knuckles 5 of the two members of the joint are disposed at right angles to each other, or, in other words, regardless of the angular disposition of the two shafts, the said knuckles will occupy such planes. This, together with the pivotal movement of the knuckles provided for by the pivot studs 6 engaging in the slots 4, establishes the desired universal connection.

From the foregoing description of the invention it will be seen that there is provided a universal joint which will function in all different relative positions of the shaft which it connects and this without binding in any way or interfering with the rotation of the shafts. Preferably the slots 8 are widened in the direction of the relatively adjacent sides of the knuckles 5 so as to provide for free pivotal movement of the ends of the link 11 in said slots.

Having thus described the invention, what is claimed as new is:

A universal coupling comprising recessed heads, the circumscribing wall of each head having longitudinal slots formed therein at diametrically opposite points, a knuckle in the recess of each head and having terminal studs pivotally and slidably engaging the slots in the walls thereof and provided intermediate its ends with a longitudinal slot, a link having its end flattened, the flattened ends being disposed at a right angle to each other and engaging the slots of the respective knuckles, and means pivotally connecting the flattened ends of the link to the respective knuckles.

In testimony whereof I affix my signature.

CHARLES WALTER HARRIS. [L. S.]